Figure 1:
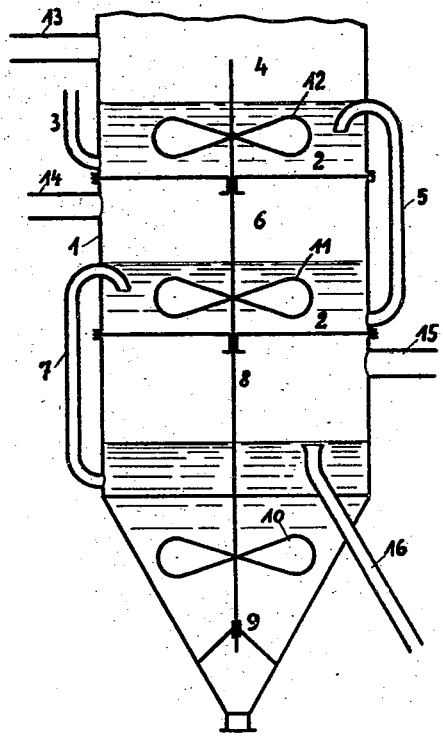

March 17, 1936.  W. GENSECKE  2,034,615
PROCESS OF AND APPARATUS FOR THE PRODUCTION OF COARSE CRYSTALS
BY EVAPORATION IN VACUO AND INTERMITTENT COOLING
Filed Nov. 29, 1932   3 Sheets-Sheet 3

Inventor:
Wilhelm Gensecke

By Potter Pierce & Scheffler
his Attorneys.

Patented Mar. 17, 1936

2,034,615

UNITED STATES PATENT OFFICE 2,034,615

PROCESS OF AND APPARATUS FOR THE PRODUCTION OF COARSE CRYSTALS BY EVAPORATION IN VACUO AND INTERMITTENT COOLING

Wilhelm Gensecke, Gonzenheim, near Frankfort-on-the-Main, Germany, assignor to American Lurgi Corporation, New York, N. Y., a corporation of New York Application November 29, 1932, Serial No. 644,922
In Germany November 30, 1931

4 Claims. (Cl. 23—1)

This invention relates to a process of and apparatus for the production of coarse crystals by evaporation in vacuo with intermittent cooling.

If, at a given temperature, the solution of a salt which becomes less soluble as the temperature falls, is in a state of saturation, the cooling of such solution is not immediately accompanied by deposition of crystals. The spontaneous deposition of crystals from the solution does not begin until the cooling has passed through a certain range of temperature, i. e. the zone of metastable saturation. In many cases, the crystals eventually deposited are of very fine grain. Crystals can be deposited from solutions that are in a state of metastable saturation, by introducing into the solution crystals of the same or another salt.

The present invention relates to the cultivation of coarse crystals from such saline solutions in which the temperature zone of metastable saturation has a range of only a few degrees centigrade, and which normally deposit fine-grained crystals on being cooled below said zone of metastable saturation.

It is known that coarse crystals, the size of which depends on the duration of the cooling period, can be obtained by gradually cooling saturated solutions of salts of this kind in vessels equipped with cooled stirring mechanism. According to the literature, it is essential that the solution depositing the crystals should remain within the range of the zone of metastable saturation throughout the cooling process. Even during the crystallization of salts from solutions in a condition of metastable saturation, it is possible for a portion of the salt to deposit in a fine-grained condition. If, however, the cooling proceeds very slowly during the condition of metastable saturation, a coarse-grained salt is obtained, provided, of course, a sufficient number of crystals be maintained in suspension in the solution—a condition that can be fulfilled by stirring, or by keeping the entire cooling apparatus in motion.

Apparatus have also been constructed in which the contents of the cooling apparatus are passed over a cooling surface at such a high velocity that the cooling effect, that is, the difference between the temperature at which the solution reaches the cooling surface and that at which it leaves said surface, is less than 1° C. This slightly supercooled solution is brought into contact with nuclear crystals, by which means the amount of salt corresponding to the degree of supersaturation is deposited in a coarse-grained form.

The known methods for producing coarse crystals consist, therefore, in cooling at a very slow rate, or else—in the case of instantaneous cooling—in lowering the temperature to only a very slight extent, e. g. less than 1° C. Such methods are not easy to operate, since undesirable deposits of salts readily occur in the event of this maximum permissible temperature difference being exceeded. In treating large quantities of saline solutions, for example in the potash industry, endeavours have long been made to recover, for further use in the process, the heat of the vapours given off during the cooling stage. On this account, the method of indirect cooling, or cooling by gradual evaporation, for obtaining coarse crystals of the salts concerned, has been abandoned, and cooling by spontaneous evaporation in vacuo has been employed instead. For this purpose, potassium chloride solution is usually cooled from about 90° C. to 30° C. in four or five stages so that an average temperature drop of about 15° C. occurs in each stage. With this fall in temperature it is impossible to cultivate coarse crystals.

Vacuum cooling apparatus, consisting of an elongated pan are also known. The pan is divided into several compartments, transversely in relation to its axis. The partitions are provided with openings only at their lowest point, so that the solution from which the dissolved salts are to be deposited in crystalline form can flow through the several compartments in succession. There is no communication between the vapour spaces of the compartments, and the vapours are led away from each space independently. The vacuum increases, to an equal extent, in each successive compartment, in the direction of flow, so that the difference in vapour pressure between the several successive compartments is the same. With such an adjustment of the negative pressures in the several compartments, no regular cultivation of the crystals can be obtained if the cooling of the solutions in each stage is greater than the temperature range of the zone of metastable saturation, even when the pressure difference maintained between the several compartments is small and the compartments are provided with stirring mechanism—a practice also known in connection with other vacuum cooling plants. If it were desired to effect the vacuum cooling within the metastable zone, the number of apparatus to be connected in series would be so large that practical and economical considerations must cause such a plant to be regarded as unsuitable.

According to the present invention, the cultivation of crystals by the vacuum cooling of solutions depositing salts upon cooling—such as solutions of sodium sulphate, sodium carbonate, magnesium sulphate or potassium chloride—is carried out in such a manner that the difference between the admission and outlet temperature of the solution with gradual evaporation, in the several cooling stages of the vacuum plant, is increased to about double (at the most) the temperature range of the zone of metastable saturation, the nuclear crystals being kept in suspension in the solution, for example by means of stirrers. Preferably, in each evaporation stage, the solution is admitted at such a depth below the level of the liquid that the pressure of the column of liquid above the point of entry is about equal to the pressure drop the solution sustains in that stage. In this manner a sufficiently gradual evaporation is ensured in all cases.

The procedure which is apparently contradictory to theory, but has been proved accurate by numerous experiments, can be explained as follows:—

If a saturated solution be introduced at such a depth below the level of the liquid in a cooling apparatus that no evaporation is as yet able to occur in the supply pipe, the freshly admitted solution will begin to evaporate at a certain depth below the level of the liquid. If, for example, the absolute vapour tension above the solution be 55 mm. mercury gauge (corresponding to a saturated-steam temperature of 40° C.) and the solution be admitted with a temperature of 45° C., the first bubble is liberated at about 230 mm. below the surface of the liquid, provided the specific gravity of the liquid above the bubble = 1. However, since the solution continues to cool on its way to the evaporative surface, the column of liquid above the bubbles of vapour already forming at the deepest point is not uniform, but consists of a mixture of vapour and liquid, the specific gravity of which is considerably lower than that of the solution itself. Consequently, the height of this layer of vapour and liquid must be kept substantially higher than specified above for pure liquid. It must amount to 600 mm. or more, so that a vertical path of more than 600 mm. must be available between the admission point and the surface of the liquid in the cooling apparatus, in order to cool the solution down from 45° C. to 40° C. If now, nuclear crystals in sufficient number be brought into the solution, for example by slow stirring, no fine crystals of the salt will form, because the path of the freshly admitted solution from the inlet to the surface of the liquid will be so great, and therefore the time taken by the solution to travel said path, will be so long that the crystallization occurring as cooling progresses will take place entirely on the nuclear crystals and the solution will be maintained within the zone of metastable saturation. Of course, the temperature drop cannot be too greatly increased in a single stage, because, in such case, the liberation of vapour would be so intensive as to allow the freshly admitted liquid to be carried very quickly to the surface, so that the separation of the salt would no longer take place entirely within the zone of metastable temperature, and fine-grained salt would predominate. By maintaining a temperature difference of 3 to 6° C., uniform ebullition occurs and the desired effect is thereby obtained. In these circumstances the evaporative surface plays only a secondary part. On the other hand, it is necessary to maintain saline crystals in suspension throughout, by gradual motion. Moreover, there is no need to have an excessively large volume of liquid in the apparatus, a column of liquid 1 metre in height being sufficient, in practice, with the specified temperatures. Accordingly, conical-bottom pans, such as are used for cooling solutions of potassium chloride and have, as is known, a height of 6 to 8 metres, can be subdivided by means of horizontal partitions, so that, for example, three cooling stages working under different pressures, can be arranged for in each apparatus. If a 4-stage vacuum-cooling plant be modified in this manner, twelve cooling stages will be obtained instead of four, so that a temperature drop of 5° C. is present in each of the newly established stages, thus enabling crystals of any convenient size to be cultivated.

Figures 2, 3:
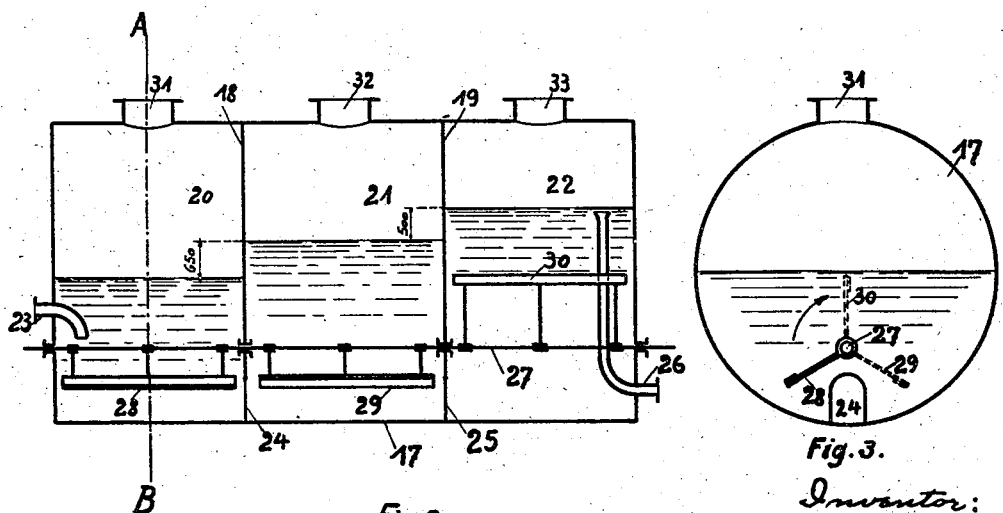
Figure 4:
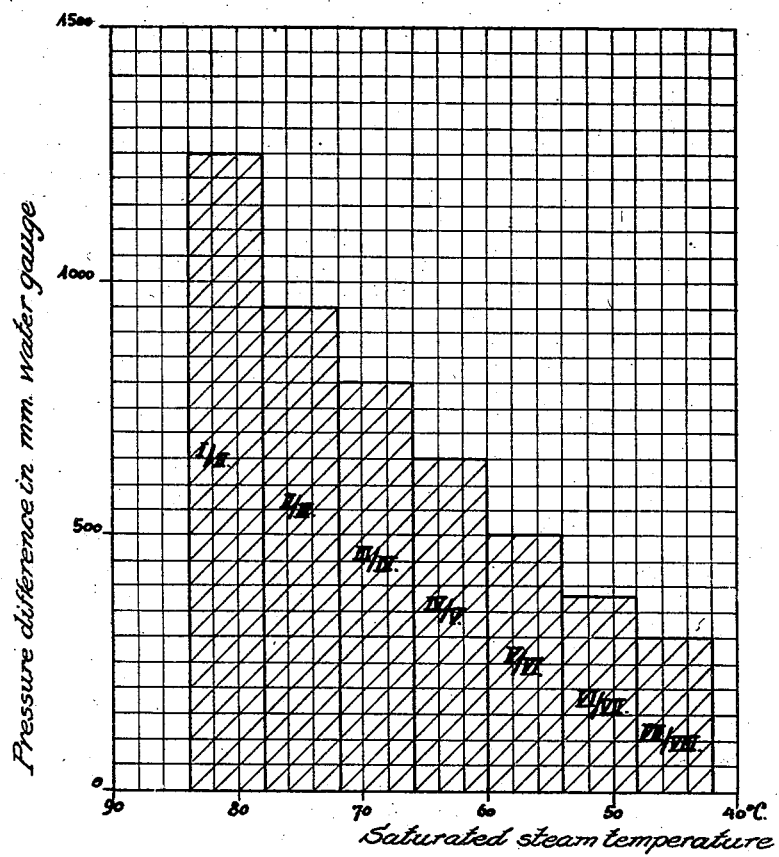

In order more clearly to disclose the nature of the present invention, reference is made to the accompanying drawings, which illustrate diagrammatically and by way of example two embodiments of apparatus which have proved specially suitable for the process according to the invention. Figures 1 and 2 are diagrammatic vertical sections of the two embodiments of the apparatus; Fig. 3 is a section along the line A—B of Fig. 2; Fig. 4 is a diagram typically explaining the temperature and vapour-pressure conditions in the process according to the invention and Fig. 5 is a diagrammatic showing of a nine stage apparatus.

Figure 5:
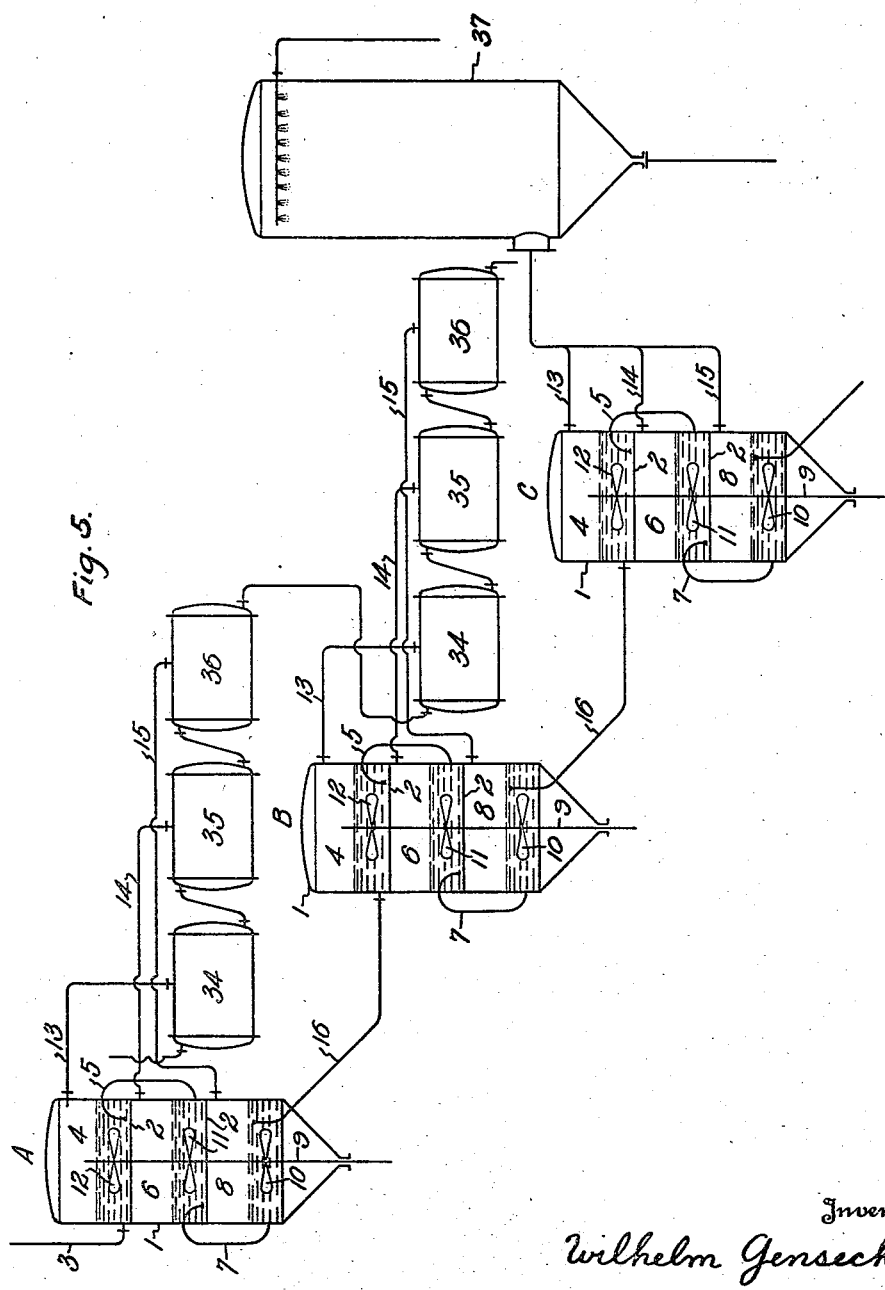

In Figs. 1 and 5, 1 denotes a known type of cooling apparatus which, according to the invention, is divided into three stages or chambers by the horizontal partitions 2. In each of these three chambers is a certain depth of liquid The solution to be cooled is admitted through the pipe 3 into the bottom of chamber 4. In this chamber 4 when, for example, the temperature range of metastable saturation of the solution is 2° C., the solution is cooled through 4° C. and is then passed through the overflow pipe 5, into the chamber 6, the mouth of said pipe 5 being also as low as possible in the chamber 6. From the chamber 6, the solution finally passes through a similar pipe 7, into the chamber 8. The solution is also cooled through 4° C. in each of the chambers 6 and 8. The stirrer shaft 9 rotates the blades 10, 11 and 12 and thereby maintains a certain quantity of crystals in suspension. The stirring mechanism may be of any suitable design, so that, for example, the solution in each chamber is moved by a horizontally—instead of vertically—guided shaft (see Figs. 2 and 3). The pipes 5 and 7 are preferably located outside the apparatus, in order to be more readily accessible. The vapours formed in the several stages are led away through the pipes 13, 14 and 15, either jointly into a single condenser 37 (see unit C, Fig. 5), in which the liquid required for preparing the solution to be treated is preheated, or else as also appears from Fig. 5, units A and B into separate condensers 34, 35 and 36 for each chamber 4, 6 and 8 of both units A and B. In the former case, the vapour from the chambers 4 and 6 is throttled to the pressure of that from chamber 8. In the other case, the dissolving liquid can be preheated to a greater extent, since the vapours from chambers 4 and 6 have a higher saturated-steam temperature than those from chamber 8. The solution and deposited crystals are jointly evacuated from the chamber 8 through an overflow pipe 16, for example into the next cooling apparatus units B and C. It is not absolutely essential that the apparatus 1 should be sub-divided by means of horizontal partitions. The partitions may also be conical, chiefly when partial deposits are formed as the result of increased separation of the salt in cooling. In such case the liquor would be drawn off from the conical bottom through a siphon instead of from the surface.

Figs. 2 and 3 represent a cylindrical apparatus 17, divided into three chambers 20, 21 and 22 by the partitions 18 and 19. The solution from which the salts are to be deposited enters the chamber 20 through the supply pipe 23. It passes successively through the chambers 21 and 22 by way of openings 24 and 25 in the bottom part of the partitions 18 and 19, and is run off from the final chamber through the overflow 26. The shaft 27, which passes through all the chambers, carries stirrer arms 28, 29 and 30. The outlets for the vapours from the chambers are denoted by 31, 32 and 33.

The apparatus according to Fig. 2 may serve, for example, as the 4th, 5th and 6th cooling stages in the crystal-cultivation process of the present invention, the diagram of Fig. 4 being characteristic of the invention. According to this diagram the solution is cooled through 6° C. in each stage. The temperature of the vapour liberated from the solution prior to entering the first stage, is 90° C. Since the cooling in each stage is 6° C., the saturated-steam temperature of the vapours in the first stage is 84° C., in the second 78° C., in the third 72° C., in the fourth 66° C., in the fifth 60° C., in the sixth 54° C., and so on. These temperatures and also the dependence of the pressure differences thereon, are shown in the diagram of Fig. 4. In accordance with the specified difference in the saturated-steam temperature of the several cooling stages, the difference in the absolute pressure in the first and second stages is therefore 1250 mm. water gauge, and between the second and third stages 950 mm. and so on. The pressure differences between the chambers 20—21 and 21—22 amount to 650 and 500 mm. water gauge respectively. The level of the liquid in each chamber is determined by these pressure differences.

It follows therefore that, in all cases, the pressure difference between each two successive chambers is smaller than that between the two preceding stages. It is only by maintaining these conditions of pressure and temperature that coarse crystals can be obtained, even under the most difficult circumstances, by the evaporation of saline solutions in vacuo.

I claim:

1. Process for crystallizing dissolved substances from solutions thereof which comprises providing and maintaining a series of bodies of the solution, maintaining a lower temperature in and a lower pressure on each succeeding body of the series, agitating each of said bodies to maintain crystals in suspension therein, passing solution through said series of bodies of solution beginning with the body at the highest temperature and proceeding through the series to the body of lowest temperature, reducing the temperature of the solution as it flows through each of said bodies by spontaneous vaporization, introducing solution into each of said bodies at a sufficient distance below the surface thereof that vaporization of the solution and crystal growth occur during the rise of the solution through the body, and maintaining a temperature difference in each of said bodies between the points at which solution is introduced and withdrawn substantially twice the range of temperature of the zone of metastable saturation of the solution.

2. Process as defined in claim 1 in which the temperature difference between the points at which solution is introduced into and withdrawn from each body is at least once and not more than twice the range of temperature of the zone of metastable saturation of the solution.

3. Process as defined in claim 1 in which the height of each body of liquid between the points at which the solution is introduced and withdrawn is sufficient to provide a hydrostatic pressure substantially equal to the difference between the pressure maintained on said body and the preceding body.

4. Process as defined in claim 1 in which a difference in temperature between the points at which solution is introduced into and withdrawn from each body is at least 3° C. and not more than 6° C.

WILHELM GENSECKE.